C. WEBSTER.
INSULATOR FOR COFFEE AND TEA POT HANDLES.
APPLICATION FILED JUNE 26, 1914.
1,128,827.
Patented Feb. 16, 1915.
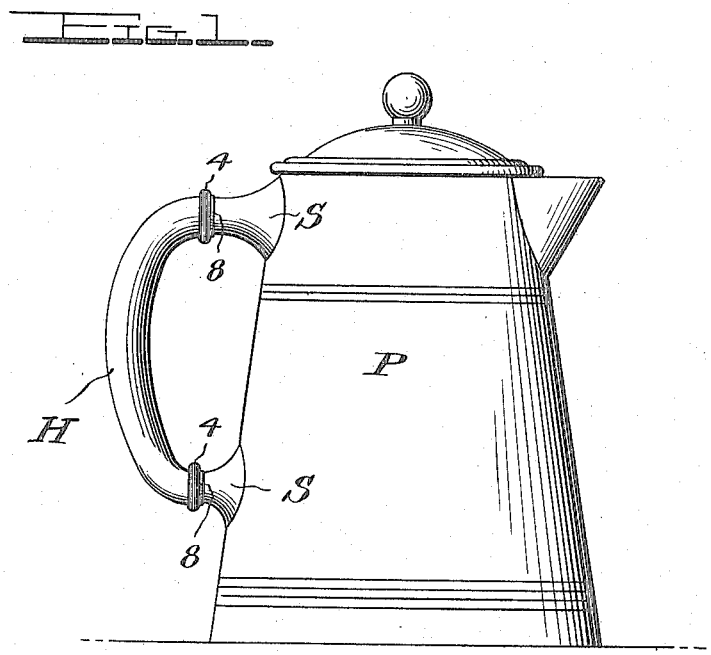
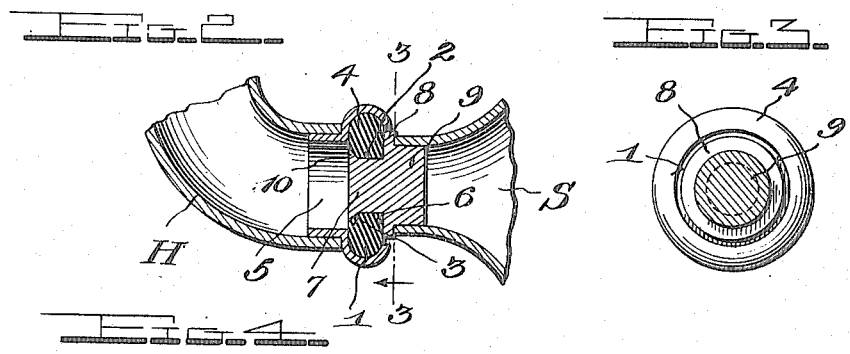
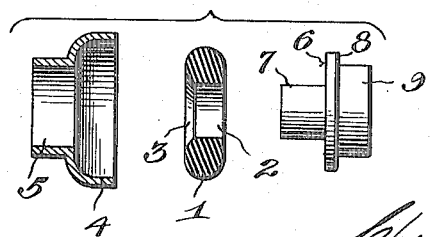

UNITED STATES PATENT OFFICE.

CHRISTOPHER WEBSTER, OF PROVIDENCE, RHODE ISLAND, ASSIGNOR TO GORHAM MANUFACTURING COMPANY, OF PROVIDENCE, RHODE ISLAND, A CORPORATION OF RHODE ISLAND.

INSULATOR FOR COFFEE AND TEA POT HANDLES.

1,128,827.

Specification of Letters Patent.

Patented Feb. 16, 1915.

Application filed June 26, 1914. Serial No. 847,457.

*To all whom it may concern:*

Be it known that I, CHRISTOPHER WEBSTER, a citizen of the United States, residing at Providence, in the county of Providence and State of Rhode Island, have invented a new and useful Improvement in Insulators for Coffee and Tea Pot Handles, of which the following is a specification.

This invention relates to certain new and useful improvements in insulators for coffee and tea pot handles, and the object of the same is to provide an improved insulator which employs or necessitates the employment of a minimum of insulating material.

Further, the invention aims to provide an insulator which is of simplified construction and involves a minimum of material in the manufacture thereof, and to also provide parts which can be easily and quickly assembled to produce the complete insulator.

In the drawings Figure 1 is a side elevation of a coffee pot to which the present invention is applied. Fig. 2 is an enlarged fragmentary longitudinal sectional view taken through one of the ends of the handle. Fig. 3 is a section taken on the line 3—3 of Fig. 2. Fig. 4 is a longitudinal sectional view of the parts, showing same in their separated relation and ready for assemblage.

The invention consists of a disk 1 of insulating material such as fiber which is provided with an opening 2 at the center thereof which opening is slightly flared at 3. The disk preferably has a rounded periphery and is received within the enlarged end or cup 4 of a sleeve member 5, the latter being received within the adjacent end of the handle H of the pot P. The free end portion of the enlarged part 4 of the sleeve 5 is swaged over the periphery of the disk 1, so as to clamp same rigidly to the sleeve. A preferably brass stud 6 is formed with a circumferential flange 8, which is located between the ends 7 and 9 of the stud, the end 7 being of less diameter than that of the end 9. The end 7 is passed through the opening 2 of the insulating disk 1, and is headed or upset at 10 into the flared end 3 of the opening 2 so as to clamp the disk 1 to the stud 6, and against the shoulder which the circumferential flange 8 forms on one side thereof. The side of the flange 8 adjacent to the end 9 forms a second shoulder which abuts the end of the socket member S of the pot P, the end 9 being received within the socket S. Obviously the ends of the handle H and the ends of the sockets S may be soldered, pinned or otherwise secured to the sleeves 5 and the sockets S respectively.

From the above it will be apparent that the insulator embodies a relatively thin insulating disk, which can be economically produced, and a pair of coupling members, one of which is headed into engagement with the insulating disk and the other of which is swaged into engagement with the disk periphery, so as to clamp each of the couplings to the disk, which assemblage of parts can be quickly and easily practised.

Since the free edge of the swaged part of the sleeve does not contact with the flange 8 of the stud, it will be evident that the insulation of the metallic parts is thus effected, and in addition since the said free edge of the swaged part of the sleeve overlies the flange 8, no parts are exposed which are unsightly, or which detract from the appearance of the pot.

Having thus described my invention, I claim as new and desire to secure by Letters Patent;—

1. In an insulator for coffee and tea pot handles, an insulating disk having a central opening flared at one end, a stud having one end received in said opening of the disk and headed into the flared end thereof, a circumferential flange on the stud between the ends thereof which flange engages the disk on one of its side faces, the other end of the stud being for the reception of a socket member on the pot, which socket member abuts the opposite side face of the flange, and a sleeve having an enlarged end which is swaged over the periphery of the disk, the sleeve being received within the handle member of the pot.

2. In an insulator for handles of pots and the like, an insulating disk having a central opening, a stud having a flange between its ends, and having one of the ends thereof passed through the disk opening and secured thereto, and having its opposite end for securement to the pot, and a sleeve having an enlarged end swaged over the periphery of the disk, said sleeve being received within the handle of the pot.

3. In an insulator for pot handles, a central insulating disk having a central opening, a stud passed through and headed into engagement with the disk and projecting outwardly from one side face thereof, and a sleeve swaged into engagement with the periphery of the disk and having a part thereof extending on the opposite side face of the disk, said part of the sleeve and the outwardly projecting part of the stud being for engagement with the pot and pot handle.

4. In a handle insulator, a perforated insulating disk, a stud having its inner end secured in the perforation of said disk and having its outer end free and having an intermediate peripheral flange, and a member having a sleeve-like part on its inner end which sleeve-like part is swaged over the periphery of the disk and has its free edge surrounding and alined with said flange, the outer end of said member being free and extending on the opposite side of the disk.

In testimony whereof I have signed my name to this specification in the presence of two subscribing witnesses.

CHRISTOPHER WEBSTER.

Witnesses:
ADA E. HAGERTY,
J. A. MILLER.

Copies of this patent may be obtained for five cents each, by addressing the "Commissioner of Patents, Washington, D. C."